(12) United States Patent
Yanagi et al.

(10) Patent No.: US 9,455,574 B2
(45) Date of Patent: Sep. 27, 2016

(54) POWER DISTRIBUTION SYSTEM

(75) Inventors: Yasuhiro Yanagi, Osaka (JP); Kiyotaka Takehara, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 790 days.

(21) Appl. No.: 13/496,280

(22) PCT Filed: Aug. 30, 2010

(86) PCT No.: PCT/IB2010/002120
§ 371 (c)(1),
(2), (4) Date: Apr. 9, 2012

(87) PCT Pub. No.: WO2011/033350
PCT Pub. Date: Mar. 24, 2011

(65) Prior Publication Data
US 2012/0187761 A1    Jul. 26, 2012

(30) Foreign Application Priority Data

Sep. 15, 2009 (JP) .................... 2009-213503

(51) Int. Cl.
| | |
|---|---|
| H02J 1/10 | (2006.01) |
| H02J 3/00 | (2006.01) |
| H02J 3/14 | (2006.01) |
| H02M 1/10 | (2006.01) |
| H02J 1/14 | (2006.01) |
| H01M 10/44 | (2006.01) |

(Continued)

(52) U.S. Cl.
CPC .............. *H02J 1/14* (2013.01); *H01M 10/44* (2013.01); *H01M 10/465* (2013.01); *H01M 10/48* (2013.01); *Y10T 307/391* (2015.04); *Y10T 307/461* (2015.04)

(58) Field of Classification Search
CPC .. H01M 10/44; H01M 10/48; H01M 10/465; H02J 1/14; H02J 1/00
USPC .................................. 307/29, 38, 64, 65, 66
See application file for complete search history.

(56) References Cited

U.S. PATENT DOCUMENTS

| | | | |
|---|---|---|---|
| 7,060,379 B2* | 6/2006 | Speranza | H01M 8/04626 307/65 |
| 2008/0106147 A1* | 5/2008 | Caggiano | H02J 13/0062 307/39 |

(Continued)

FOREIGN PATENT DOCUMENTS

| | | |
|---|---|---|
| JP | 2004-015035 A | 1/2004 |
| JP | 2005129800 | 5/2005 |

(Continued)

OTHER PUBLICATIONS

Japanese Office Action dated Oct. 29, 2013.

(Continued)

*Primary Examiner* — Jared Fureman
*Assistant Examiner* — Esayas Yeshaw
(74) *Attorney, Agent, or Firm* — Bacon & Thomas, PLLC

(57) ABSTRACT

A power distribution system includes a direct current (DC) power source and an appliance selection unit for selecting one or more appliances that can be operated with an available power of the DC power source. The power distribution system further includes a display unit for displaying results of selection by the appliance selection unit.

18 Claims, 9 Drawing Sheets

(51) Int. Cl.
*H01M 10/46* (2006.01)
*H01M 10/48* (2006.01)

(56) References Cited

U.S. PATENT DOCUMENTS

| | | | |
|---|---|---|---|
| 2009/0027932 A1* | 1/2009 | Haines | H02J 9/062 363/95 |
| 2009/0179493 A1* | 7/2009 | Yeh | H02J 7/0055 307/64 |
| 2010/0256828 A1* | 10/2010 | Wang | G06Q 50/06 700/286 |
| 2011/0278921 A1* | 11/2011 | Fretheim | H02J 3/38 307/24 |
| 2013/0057073 A1* | 3/2013 | Masciarelli | H02J 9/062 307/66 |

FOREIGN PATENT DOCUMENTS

| | | |
|---|---|---|
| JP | 2006275804 | 10/2006 |
| JP | 2007166818 | 6/2007 |
| JP | 2008173152 | 7/2008 |
| JP | 2009178025 | 8/2009 |

OTHER PUBLICATIONS

The International Search Report.

* cited by examiner

| APPLIANCE | POWER(W) | USED TIME (MINUTES) | ELECTRIC ENERGY (Wh) |
|---|---|---|---|
| DISH WASHER | 900 | 60 | 900 |
| RICE COOKER | 700 | 50 | 600 |
| CLEANER | 1000 | 20 | 350 |
| BEDDING DRYER | 500 | 30 | 250 |
| IRON | 1200 | 10 | 200 |
| TROUSER PRESS | 300 | 15 | 75 |
| DRYER | 600 | 5 | 50 |
| MOBILE PHONE (CHARGING) | 15 | 60 | 15 |
|  |  |  |  |

FIG.4

CURRENT RESIDUAL CAPACITY OF SECONDARY BATTERY : 500Wh

AVAILABLE APPLIANCE

| APPLIANCE | Wh |
|---|---|
| CLEANER | 350 |
| BEDDING DRYER | 250 |
| IRON | 200 |
| TROUSER PRESS | 75 |
| DRYER | 50 |
| MOBILE PHONE (CHARGING) | 15 |

UNAVAILABLE APPLIANCE

| APPLIANCE | Wh |
|---|---|
| DISH WASHER | 900 |
| RICE COOKER | 600 |

IF YOU USE THESE APPLIANCES, IT WILL BE PROFITABLE TO USE NIGHT TIME POWER AFTER 11 P.M.

FIG. 5

| CURRENT RESIDUAL CAPACITY OF SECONDARY BATTERY : 500Wh |||||
|---|---|---|---|---|
| X2 AVAILABLE APPLIANCE ||  X3 UNAVAILABLE APPLIANCE ||
| APPLIANCE | Wh | APPLIANCE | Wh |
| CLEANER | 350 | DISH WASHER | 900 |
| BEDDING DRYER | 250 | RICE COOKER | 600 |
| IRON | 200 | | |
| TROUSER PRESS | 75 | | |
| DRYER | 50 | | |
| MOBILE PHONE (CHARGING) | 15 | | |

X5: ACCORDING TO THE WEATHER FORECAST, IT WILL BE CLEAR TOMORROW, SO IT IS RECOMMENDED THAT THESE APPLIANCES BE USED TOMORROW

FIG. 7

| APPLIANCE LIST, SELECT APPLIANCES SCHEDULED TO BE USED (TB) | | |
|---|---|---|
| APPLIANCE | Wh | SELECT APPLIANCES SCHEDULED TO BE USED |
| DISH WASHER | 900 | ☑ |
| RICE COOKER | 600 | ☑ |
| CLEANER | 350 | ☐ |
| BEDDING DRYER | 250 | ☐ |
| IRON | 200 | ☐ |
| TROUSER PRESS | 75 | ☑ |
| DRYER | 50 | ☑ |
| MOBILE PHONE (CHARGING) | 15 | ☑ |

FIG. 8

CURRENT RESIDUAL CAPACITY OF SECONDARY BATTERY : 1000Wh

X11

X12 APPLIANCE RECOMMENDED FOR USE

| APPLIANCE | Wh |
|---|---|
| DISH WASHER | 900 |
| TROUSER PRESS | 75 |
| MOBILE PHONE (CHARGING) | 15 |

SUM : 990Wh

X13 REMAINING APPLIANCE

| APPLIANCE | Wh |
|---|---|
| RICE COOKER | 600 |
| DRYER | 50 |

X14: IF YOU USE THESE APPLIANCES, IT WILL BE PROFITABLE TO USE NIGHT TIME POWER AFTER 11 P.M.

POWER DISTRIBUTION SYSTEM

FIELD OF THE INVENTION

The present invention relates to a power distribution system.

BACKGROUND OF THE INVENTION

There is a power distribution system that is provided with a Direct Current (DC) power source, such as a solar cell which generates power using solar light in the daytime and a secondary battery which is charged by a commercial power source or a distributed power source such as the solar cell, and that uses both DC power from the DC power source and the commercial power source to operate home electric appliances (for example, see Japanese Patent Application Publication No. 2009-178025).

SUMMARY OF THE INVENTION

In such a power distribution system, it may be more economical to use a secondary battery charged with a nighttime power of the commercial power source or a surplus power of a distributed power source such as a solar cell, commercial power source, as a source for supplying power to the appliances. For example, an electric bill can be lowered by charging the secondary battery at low cost either using nighttime power in which the electricity rate of the commercial power source is low, or using electric power generated by the solar cell, and then operating the appliances using the power charged in the secondary battery. Further, in the daytime, the electric bill can be lowered by operating the appliances using both the secondary battery and the solar cell.

However, since the residual capacity of the secondary battery or the amount of power generated by the solar cell varies, it is difficult to correspondingly operate the appliances depending on the power consumption thereof using only the DC power source. In this case, the appliances must be operated with the commercial power source together with the DC power source. Since the electricity rate of the commercial power source is high during the daytime or the like, using the commercial power source together with the DC power source is not economical due to the increased cost. Further, a user is incapable of determining an appliance that can be operated with the current residual capacity of the DC power source, and has a difficulty efficiently operating the appliance using the power of the DC power source.

The present invention has been made keeping in mind the above problems occurring in the prior art, and the present invention provides a power distribution system, which can efficiently and economically use the power of a DC power source to operate the appliances.

In accordance with one aspect of the present invention, there is provided with a power distribution system including: a direct current (DC) power source; an appliance selection unit for selecting one or more appliances that can be operated with an available power of the DC power source; and a display unit for displaying results of selection by the appliance selection unit.

The power distribution system may further include: a power supply unit for supplying power to a plurality of appliances using a power supplied from the DC power source; an available power detection unit for detecting an amount of power that can be supplied from the DC power source; and a power information storage unit for storing information about a power consumption of each appliance, wherein the DC power source includes at least one of a secondary battery and a solar cell, and wherein the appliance selection unit selects one or more appliances that can be operated with the available power of the DC power source, based on the available power of the DC power source and the information about the power consumption of each appliance.

In accordance with this configuration, a user sets the appliances to be used, by referring to the results of the selection of appliances that can be operated with the DC power source, so that it is possible to effectively use the power of the DC power source without using power supplied from the commercial power source if possible, thus efficiently and economically using the power of the DC power source when the appliances are operated.

Preferably, the DC power source may include only the secondary battery, the available power detection unit detects a residual capacity of the secondary battery, and the appliance selection unit selects one or more appliances that can be operated with the residual capacity of the secondary battery, based on the residual capacity of the secondary battery and the information about the power consumption of each appliance.

In accordance with this configuration, the user sets the appliances to be used, by referring to the results of selecting those appliances that can be operated with the residual capacity of the secondary battery, so that it is possible to effectively use the power charged in the secondary battery without using power supplied from the commercial power source whenever possible, thus efficiently and economically using the power charged in the secondary battery to operate the appliances.

Preferably, the DC power source may include the secondary battery and the solar cell, the available power detection unit detects a residual capacity of the secondary battery and a power generated by the solar cell, and the appliance selection unit selects one or more appliances that can be operated with the residual capacity of the secondary battery and the power generated by the solar cell, based on a sum of the residual capacity of the secondary battery and the power generated by the solar cell and the information about the power consumption of each appliance.

In accordance with this configuration, the user sets the appliances to be used, by referring to the results of the selection of appliances that can be operated with the residual capacity of the secondary battery and the power generated by the solar cell, so that it is possible to effectively use the power charged in the secondary battery and the power generated by the solar cell without using the power supplied from the commercial power source if possible, thus efficiently and economically using the power charged in the secondary battery and the power generated by the solar cell when the appliances are operated.

Preferably, the appliance selection unit may select appliances, each of which can be operated with the available power of the DC power source.

In accordance with this configuration, the user determines whether each appliance can be operated with the DC power source, by referring to the results of selecting those appliances that can be operated with the DC power source.

Preferably, the display unit may display appliances selected by the appliance selection unit in descending order of power consumption.

Accordingly, the user can easily recognize that an appliance located at an upper position in the list is an appliance that can be efficiently used using the DC power source.

Preferably, the power distribution system may further include a manipulation unit for allowing a user to designate a plurality of appliances, wherein the appliance selection unit selects, from the appliances designated by the manipulation unit, a combination of appliances that can be operated with the available power of the DC power source.

In accordance with this configuration, referring to the results of selecting combinations of appliances that can be operated with the DC power source, the user can conveniently use the appliances because the user does not need to personally consider a combination of appliances to be used.

Preferably, the appliance selection unit may select all combinations of appliances that can be operated with the available power of the DC power source.

In accordance with this configuration, a user refers to all combinations of appliances that can be operated with the DC power sources, thus increasing the number of selection items required when setting the appliances to be used.

Preferably, the appliance selection unit may select, from the combinations of appliances that can be operated with the available power of the DC power source, a combination of appliances of which a sum of power consumption is highest.

In this way, the DC power source can be used as effectively as possible.

Preferably, the power distribution system may further include a proposal unit for creating a proposal that appliances, which are not selected by the appliance selection unit as the appliances that can be operated with the available power of the DC power source, be operated with night-time power of the commercial power source, and outputting the proposal to the display unit, wherein the display unit displays the proposal.

In accordance with this configuration, advice provided regarding the use of appliances that are not selected is also displayed, thus allowing the user to more conveniently use appliances.

Preferably, the information about the power consumption of each appliance, stored in the power information storage unit, is information generated based on a history of power consumed when each appliance is operated.

Accordingly, the power information storage unit stores power consumption information calculated based on the actual operations of the appliances, and thus accuracy in the selection of appliances by the appliance selection unit is improved.

BRIEF DESCRIPTION OF THE DRAWINGS

The objects and features of the present invention will be apparent from the following description of embodiments when taken in conjunction with the accompanying drawings, in which:

FIG. 3 is a diagram showing the appliance table of embodiment 1;

FIG. 4 is a diagram showing one display of lists in embodiment 1;

FIG. 5 is a diagram showing another display of lists in embodiment 1;

FIG. 7 is a diagram showing a list of appliances scheduled to be used in embodiment 2;

FIG. 8 is a diagram showing the display of lists in embodiment 2; and

DETAILED DESCRIPTION OF THE PREFERRED EMBODIMENTS

Figure 1:
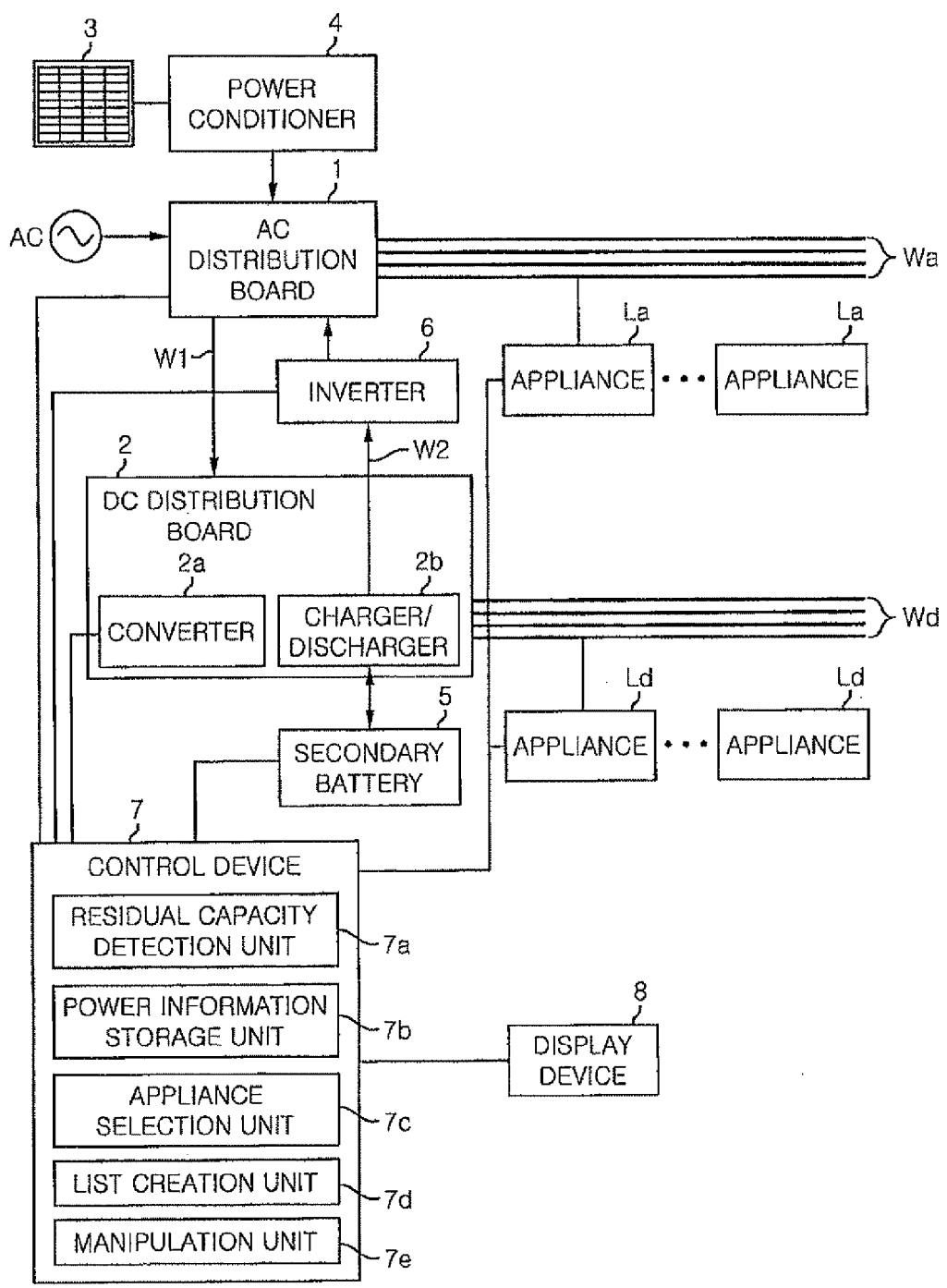
FIG. 1 is diagram showing the configuration of a power distribution system according to embodiment 1.

Embodiments of the present invention will be described in detail below with reference to the accompanying drawings that constitute part of the present specification. The same reference numerals will be assigned to the same or similar components throughout the drawings, and redundant descriptions thereof will be omitted.

Hereinafter, embodiments of the present invention will be described with reference to the drawings.

Embodiment 1

A power distribution system in accordance with the present embodiment is mainly used in a house, and includes an AC distribution board 1 to which AC power supply lines Wa for supplying power to AC appliances La driven by an AC power are connected, and a DC distribution board 2 to which DC power supply lines Wd for supplying power to DC appliances Ld driven by a DC power are connected, as shown in FIG. 1. Further, for the power sources of this system, a commercial power source AC is used as the AC power source, and at least one of a solar cell 3 and a secondary battery 5 is used as the DC power source. Furthermore, when the AC appliances La and the DC appliances Ld do not need to be distinguished from each other, they are designated as appliances L. Although a detached house is assumed and described as the building to which the present invention is applied, the application of the technical spirit of the present invention to buildings, such as a multiple dwelling house, an office, a shopping district, or a plant, is not intended to be excluded.

The AC distribution board 1 to which the AC power supply lines Wa are connected is supplied with AC power from the commercial power source AC and from the solar cell 3 that is a distributed power source via a power conditioner 4. The AC distribution board 1 includes a main breaker (not shown), a plurality of branch breakers (not shown), switches, and so forth, and supplies AC power to the AC power supply lines Wa branched from the load side of the branch breakers, and to an AC connection line W1. Further, the power conditioner 4 has the function of converting DC power generated by the solar cell 3 into AC power and adjusting an output frequency and an output voltage to connect to the commercial power source AC (grid).

Meanwhile, the DC distribution board 2 to which the DC power supply lines Wd are connected is supplied with AC power from the AC distribution board 1 via the AC connection line W1, and is provided with a converter 2a for converting the AC power into DC power of a desired voltage. The converter 2a is an AC-DC conversion device, and the output of the converter 2a is supplied to the branched DC power supply lines Wd via a plurality of circuit protectors, switches, and so forth (not shown) that are included in the board.

Further, the DC distribution board 2 includes a charger/discharger 2b connected between the output of the converter 2a and the secondary battery 5 and configured to perform the charging/discharging of the secondary battery 5. The control of charging by the charger/discharger 2b is performed such that surplus power of the DC power supplied by the converter 2a to the DC power supply lines Wd is charged in the secondary battery 5. Further, the output voltage of the secondary battery 5 is adjusted by the charger/discharger 2b and is then supplied together with the output of the converter 2a to the DC power supply lines Wd.

As described above, the DC power output from the converter 2a and the secondary battery 5 is also supplied to an inverter 6 via a DC connection line W2. The inverter 6 is a DC-AC conversion device having the function of adjusting an output frequency and an output voltage to connect to the commercial power source AC, and is configured to convert DC power into AC power and supply the AC power to the AC power supply lines Wa via the branch breakers of the AC distribution board 1.

As can be clearly seen from the above-described configuration, it is possible to supply AC power from the AC distribution board 1 to the DC distribution board 2, and it is also possible for the converter 2a to convert the AC power into DC power and to supply the DC power to the DC power supply lines Wd. In contrast, it is possible to supply DC power from the DC distribution board 2 to the AC distribution board 1 and it is also possible for the inverter 6 to convert the DC power into AC power and to supply the AC power to the AC power supply lines Wa.

Such a power distribution system is configured such that the commercial power source AC includes the AC power source and the DC power source includes the solar cell 3 and the secondary battery. Further, the AC distribution board 1 serves as an AC power supply means for supplying AC power from the AC power supply lines Wa to the plurality of AC appliances La using the power supplied from the individual power sources and the DC distribution board 2 serves as a DC power supply means for supplying DC power from the DC power supply lines Wd to the plurality of DC appliances Ld using the power supplied from the individual power sources.

Further, a control device 7 controls power distribution in which a main power source is switched depending on the status of each power source (that is, the control of power distribution that varies the ratio of output from the respective power sources). The control device 7 monitors power supplied from the commercial power source AC, the amount of power generated by the solar cell 3, the residual capacity of the secondary battery 5, the AC power supplied from the AC distribution board 1 to the AC power supply lines Wa, and the DC power supplied from the DC distribution board 2 to the DC power supply lines Wd. Further, based on the results of the monitoring, the control device 7 controls the converter 2a, the charger/discharger 2b, the inverter 6, switches accommodated in the AC distribution board 1 and the DC distribution board 2 and so forth, and controls the transfer of power between the AC distribution board 1 and the DC distribution board 2. Furthermore, the main power source includes a source for supplying most of power to certain power supply lines compared to other power sources, as well as a source for supplying 100% of power to the certain power supply lines.

Hereinafter, the case where the control device 7 controls power distribution so that power is supplied to individual appliances L using only power charged in the secondary battery 5 will be described. First, the secondary battery 5 is charged by the converter 2a and the charger/discharger 2b using power generated by the solar cell 3 in the daytime, or using power supplied from the commercial power source AC (nighttime power) during a time span in which the electricity rate is low (for example, a time span of 22 p.m. to 7 a.m.). Further, the control device 7 controls power distribution so that power is supplied to the individual appliances L using only the power charged in the secondary battery 5 if possible, during a time span in which the electricity rate of the commercial power source AC is high (for example, the time span of 7 a.m. to 22 p.m.). The DC appliances Ld on the DC power supply lines Wd are operated with the power charged in the secondary battery 5, and the AC appliances La on the AC power supply lines Wa are operated with the power charged in the secondary battery 5 via the inverter 6. In this case, the secondary battery 5 becomes the main power source, the amount of power supplied from the commercial power source AC becomes zero, and all of the power generated by the solar cell 3 is used to charge the secondary battery 5.

However, when the residual capacity of the secondary battery 5 is reduced or when an appliance L having high power consumption is used, it is difficult to drive the appliance L using only the residual capacity of the secondary battery 5, so that the power supplied from the commercial power source AC must be used together with the secondary battery 5 even during the daytime in which the electricity rate is high, and thus this method is not economical.

Figure 2:
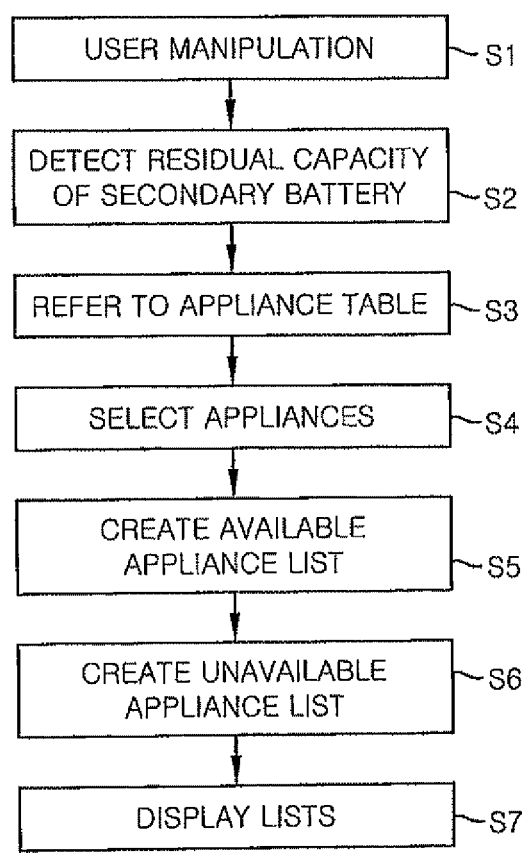
FIG. 2 is an operating flowchart of embodiment 1.

Therefore, the control device 7 includes a residual capacity detection unit 7a (available power detection means), a power information storage unit 7b, an appliance selection unit 7c, a list creation unit 7d, and a manipulation unit 7e, and is configured to present to the user a list of appliances L that can be operated with the current residual capacity of the secondary battery 5 (the available power of the DC power source) by performing the operations shown in the flowchart of FIG. 2.

First, when the user manipulates the manipulation unit 7e to make a list presentation request (step S1), the residual capacity detection unit 7a detects the residual capacity (Wh) of the secondary battery 5 (step S2). Further, the power information storage unit 7b stores information about the power consumption of each appliance L, and this power consumption information is configured in the form of an appliance table TB in which the names, power consumption (W), used time (minutes), and electric energy (Wh) of appliances L are listed, as shown in FIG. 3. Here, power consumption (W), used time (minutes), and electric energy (Wh) are the values in a standard use. Next, the appliance selection unit 7c refers to the appliance table TB of the power information storage unit 7b (step S3), and then compares the residual capacity of the secondary battery 5 with the power consumption of each appliance L listed in the appliance table TB. Thereafter, the appliance selection unit 7c selects corresponding appliances L of which power consumption is equal to or less than the residual capacity of the secondary battery 5 from the appliance table TB as available appliances (step S4). In the processing of appliance selection at step S4, the appliances L in the appliance table TB are classified as AC appliances La or DC appliances Ld. Accordingly, in the case where the power consumption of each AC appliance La is compared with the residual capacity of the secondary battery 5, conversion efficiency of the inverter 6 converting a DC power charged in the secondary battery 5 to an AC power can also be taken into consideration, so that the selection of the appliances L can be more accurate. The list creation unit 7d creates a available appliance list presenting appliances L that are selected by the appliance selection unit 7c (step S5), and also creates an unavailable appliance list presenting appliances L that are excluded from the selection by the appliance selection unit 7c (step S6). Further, the list creation unit 7d outputs the available appliance list and the unavailable appliance list, together with the residual capacity information of the secondary battery 5, to a display device 8 that is either provided near the control device 7 or integrated with the control device 7 (step S7).

As shown in FIG. 4, the display device 8 displays the current residual capacity X1 of the secondary battery 5, a available appliance list X2 in which the names and power consumptions of appliances that can be operated with the current residual capacity of the secondary battery 5 are listed, and an unavailable appliance list X3 in which the names and power consumptions of appliances that cannot be operated with the current residual capacity of the secondary battery 5 are listed.

In this way, the user determines whether each appliance is available or unavailable with the residual capacity of the secondary battery 5 by referring to the available appliance list X2 and sets the appliances L to be used. As a result, it is possible to effectively use the power charged in the secondary battery 5, without using the power supplied from the commercial power source AC if possible, during the daytime in which the electricity rate is high, thus efficiently and economically using the power charged in the secondary battery 5 when the appliances L are operated. Further, in the available appliance list X2, the individual appliances L are indicated in descending order of power consumption. The user can easily recognize that an appliance L located at the upper position of the list is an appliance that can be efficiently used using the residual capacity of the secondary battery 5.

Further, the list creation unit 7*d* may create information proposing that, at the time of using appliances L included in the unavailable appliance list X3, the appliances L be operated with the night-time power of the commercial power source AC in which the electricity rate is low, and may output the proposal to the display device 8. As shown in FIG. 4, the proposal X4 is displayed near the unavailable appliance list X3.

Alternatively, a means for accessing a network, such as the Internet, is provided in the control device 7, and is configured to obtain information about a weather forecast from a server on the Internet. The list creation unit 7*d* may create information proposing that in relation with the use of a washing machine included in the unavailable appliance list, the washing machine be used tomorrow (the next day) on which it is forecasted that the weather will be clear, and may output the proposal to the display device 8. As shown in FIG. 5, the proposal X5 is displayed near the unavailable appliance list X3.

Therefore, with the proposal X4 or X5, an advice is also displayed regarding the use of appliances L included in the unavailable appliance list X3, thus allowing the user to more easily use the appliances.

Further, the control device 7 controls power distribution so that power is supplied to individual appliances L using only the power charged in the secondary battery 5 when a power failure occurs on the commercial power source AC. The display device 8 displays the current residual capacity X1 of the secondary battery 5, the available appliance list X2, and the unavailable appliance list X3, similarly to the above case. Further, even in the case of a power failure, it is possible to effectively use the power charged in the secondary battery 5.

Furthermore, the control of power distribution performed by the control device 7 includes a mode in which power is supplied to the individual appliances L by using the commercial power source AC as the main power source, or a mode in which power is supplied to the individual appliances L using together the commercial power source AC, the solar cell 3, and the secondary battery 5, in addition to a mode in which power is supplied to the individual appliances L using only the power charged in the secondary battery 5, as described above, thus enabling the modes to be suitably switched depending on the states or times of the respective power sources.

Embodiment 2

The power distribution system in the present embodiment is shown in FIG. 1, similarly to embodiment 1, and the same reference numerals are assigned to the same components, and thus a description thereof will be omitted.

Figure 6:
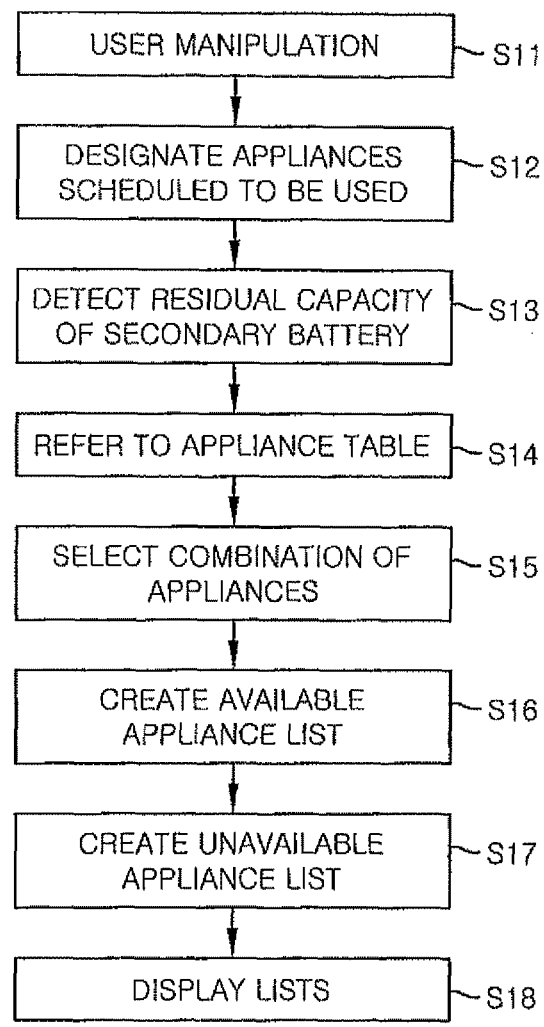
FIG. 6 is an operating flowchart showing embodiment 2.

First, the control device 7 controls power distribution so that during the daytime in which the electricity rate of the commercial power source AC is high (for example, the time span of 7 a.m. to 22 p.m.), power is supplied to individual appliances L using only the power charged in the secondary battery 5 if possible. The control device 7 performs the operations shown in the flowchart of FIG. 6 and then creates a list that presents to the user a combination of appliances L that can be operated with the current residual capacity of the secondary battery 5 (the available power of the DC power source).

First, when the user manipulates the manipulation unit 7*e* to make a list presentation request, information about a list of appliances scheduled to be used is output to the display device 8 that is provided near the control device 7 or integrated with the control device 7 (step S11). On the display device 8, a list X10 of appliances scheduled to be used is displayed in which the names and power consumption of the appliances with check boxes are listed, as shown in FIG. 7. The user designates appliances scheduled to be used by inserting check marks into check boxes corresponding to one or more appliances L desired to be used, and outputs the results of the designation to the control device 7 (step S12).

In the control device 7 that received the results of the designation of the appliances scheduled to be used, the residual capacity detection unit 7*a* detects the residual capacity (Wh) of the secondary battery 5 (step S13). Further, the power information storage unit 7*b* stores information about the power consumption of each appliance L and this power consumption information is configured in the form of an appliance table TB in which the names, power consumption (W), used time (minutes), and electric energy (Wh) are listed, as shown in FIG. 3. Here, the power consumption (W), used time (minutes), and electric energy (Wh) are the values used in a standard use.

Next, the appliance selection unit 7*c* derives all of the combinations of the appliances scheduled to be used, refers to the appliance table TB of the power information storage unit 7*b* (step S14), compares the residual capacity of the secondary battery 5 with the power consumption of each combination of appliances scheduled to be used (the sum of the power consumption of the combined appliances L), extracts each combination of appliances L of which the power consumption is equal to or less than the residual capacity of the secondary battery 5, and then selects a combination having the highest power consumption from the extracted combinations (step S15). For example, when the residual capacity of the secondary battery 5 is 1000 Wh, and five appliances, that is, a dish washer, a rice cooker, a trouser press, a dryer, and a mobile phone charger, are selected as appliances scheduled to be used, there are 31 combinations each obtained by selecting one or more from the five appliances L and then combining the selected ones, if any (combinations of five appliances). Further, among the 31 combinations, a combination of the dish washer (900 Wh), the trouser press (75 W), and the mobile phone charger (15 W) (the sum of the power consumption is 990 Wh) is extracted as the combination of which the sum of the power consumption is equal to or less than 1000 Wh and is the highest. The rice cooker and the dryer scheduled to be used are excluded from the combination.

The list creation unit $7d$ creates a available appliance list that presents the combinations of the appliances L selected by the appliance selection unit $7c$ (step S16), and also creates an unavailable appliance list that presents appliances L excluded from the combinations of appliances selected by the appliance selection unit $7c$ (step S17). Further, the list creation unit $7d$ outputs the available appliance list and the unavailable appliance list, together with the residual capacity information of the secondary battery 5, to the display device 8 (step S18).

As shown in FIG. 8, the display device 8 displays the current residual capacity X11 of the secondary battery 5, a available appliance list X12 in which the names and the power consumption of appliances combined to be available with the current residual capacity of the secondary battery 5 are listed, and an unavailable appliance list X13 in which the names and power consumption of appliances excluded from the combination of appliances selected by the appliance selection unit $7c$ are listed.

In this way, the user determines the appliances L to be used with reference to the combination of appliances L that are recommended by the available appliance list X12, so that it is possible to effectively use the power charged in the secondary battery 5, without using the power supplied from the commercial power source AC if possible, during the daytime in which the electricity rate is high, thus efficiently and economically using the power charged in the secondary battery 5 when the appliances L are operated. Furthermore, the user does not need to personally consider a combination of appliances L to be used, thus improving convenience of use.

Further, in the present embodiment, among the combinations of appliances L that can be operated with the residual capacity of the secondary battery 5, a combination of appliances L of which the sum of the power consumption is the highest is presented to the user, thus enabling the power charged in the secondary battery 5 to be used as effectively as possible. Furthermore, on the available appliance list X12, the individual appliances L are displayed in descending order of power consumption, and the user can easily recognize that an appliance L located at an upper position in the list is an appliance that can be efficiently used using the current residual capacity of the secondary battery 5.

Further, the list creation unit $7d$ may create information proposing that, in relation with the use of appliances included in the unavailable appliance list X13, the appliances be operated with nighttime power of the commercial power source AC in which the electricity rate is low, and may output the proposal to the display device 8. As shown in FIG. 8, the proposal X14 is displayed near the unavailable appliance list X13.

Therefore, with the proposal X14, an advice is provided regarding the use of appliances L included in the unavailable appliance list X3 is displayed, thus allowing the user to more conveniently use the appliances. Further, a means for accessing a network such as the Internet may be provided in the control device 7, and a proposal based on information acquired from a server on the Internet may be displayed.

Further, the control device 7 controls power distribution so that power is supplied to individual appliances L using only the power charged in the secondary battery 5 when a power failure occurs on the commercial power source AC. The display device 8 displays the current residual capacity X11 of the secondary battery 5, a available appliance list X12, and an unavailable appliance list X13, similarly to the above case. Therefore, even in the case of a power failure, it is possible to effectively use the power charged in the secondary battery 5.

Furthermore, the appliance selection unit $7c$ may extract each combination of appliances L of which the power consumption is equal to or less than the residual capacity of the secondary battery 5 from the appliances scheduled to be used after step S15, and may select all extracted combinations. In this case, the list creation unit $7d$ creates a available appliance list that presents all combinations of the appliances L selected by the appliance selection unit $7c$ and the display device 8 displays the list. Therefore, the number of selection items required when the user determines the appliances L to be used increases by referring to all combinations of appliances L recommended on the available appliance list.

Embodiment 3

Figure 9:
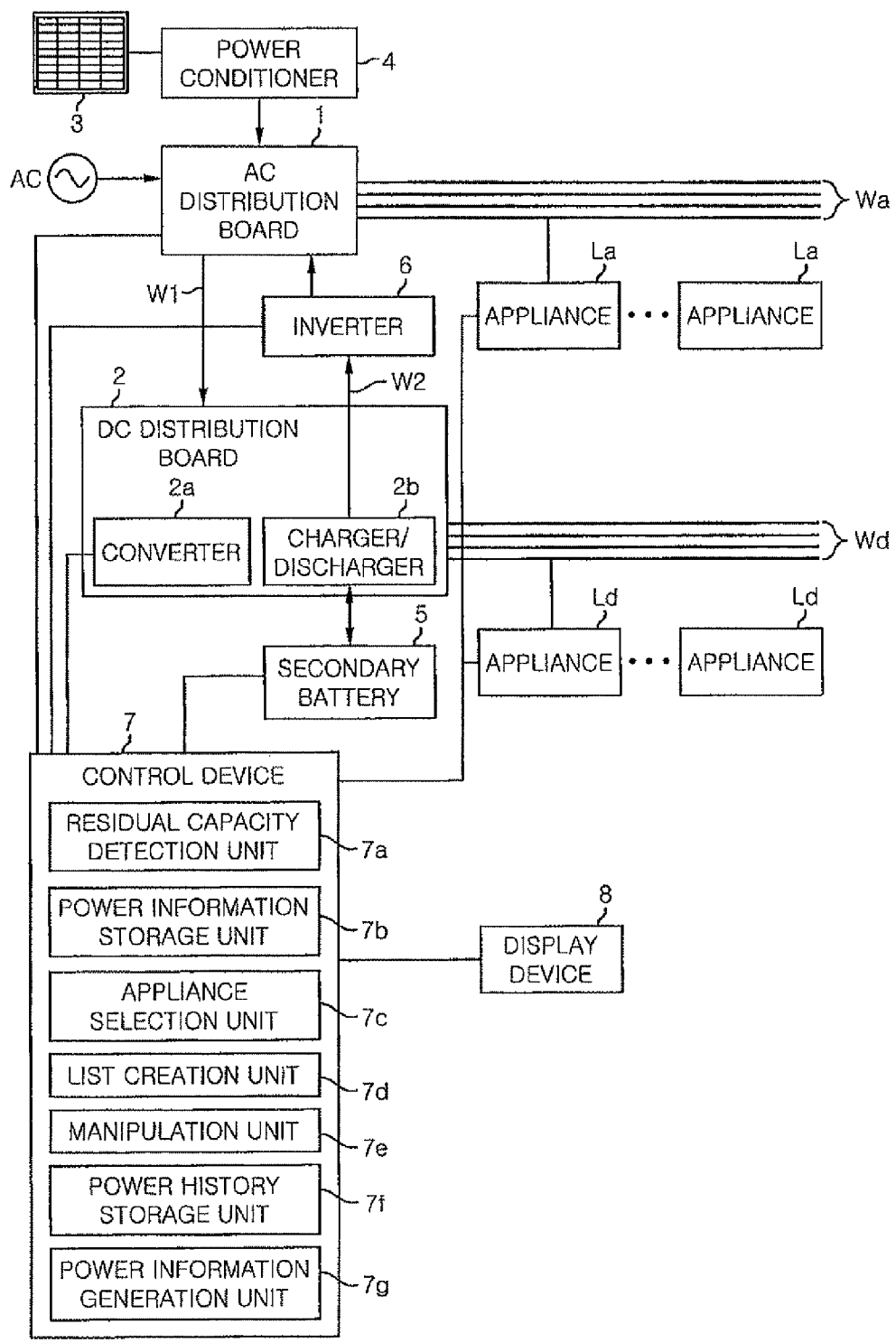
FIG. 9 is a diagram showing the configuration of a power distribution system according to embodiment 3.

A power distribution system in accordance with the present embodiment is shown in FIG. 9, and the same reference numerals are assigned to components identical to those of embodiments 1 and 2, and thus a detailed description thereof will be omitted.

A control device in accordance with the present embodiment includes a power history storage unit $7f$ and a power information generation unit $7g$. The power history storage unit $7f$ acquires information about power consumption when each appliance L is actually operated (or information about power consumption variation over time) from the appliances L, and stores the history of power consumption when each appliance L is operated once. The power information generation unit $7g$ calculates the average of the power consumption of individual appliances L when the individual appliances L are operated once, by referring to the power history storage unit $7f$, and stores the results of the calculation in the power information storage unit $7b$. That is, the power information storage unit $7b$ stores the power consumption information calculated based on the actual operations of the appliances L, and thus the accuracy of the selection of appliances by the appliance selection unit $7c$ is improved.

Further, the power information generation unit $7g$ may extract the maximal value of the power consumption when the individual appliances L are operated once, by referring to the power history storage unit $7f$, and may store the results of the extraction in the power information storage unit $7b$.

Embodiment 4

In the power distribution system according to embodiment 1, the control device 7 controls power distribution so that power is supplied to individual appliances L using only the power charged in the secondary battery 5 during a time span in which the electricity rate of the commercial power source AC is high (for example, the time span of 7 a.m. to 22 p.m.) or in the case of the commercial power source AC experiencing a power failure. All the power generated by the solar cell 3 is used to charge the secondary battery 5. That is, the only DC power source that is used is the secondary battery 5.

Meanwhile, the configuration of the power distribution system in accordance with the present embodiment is similar to that of embodiment 1, but the control device 7 controls power distribution so that power is supplied to the individual appliances L using both the power charged in the secondary battery 5 and the power generated by the solar cell 3 during the time span in which the electricity rate of the commercial power source AC is high or in the case of the commercial power source AC experiencing a power failure. Only surplus power that is not consumed by the appliances L is charged in the secondary battery 5. That is, the DC power source that is used includes both the secondary battery 5 and the solar cell 3.

First, the secondary battery 5 is primarily charged with power supplied from the commercial power source AC (nighttime power) via the converter 2a and the charger/discharger 2b during the time span in which the electricity rate is low (for example, the time span of 22 p.m. to 7 a.m.), Further, the control device 7 controls power distribution so that power is supplied to individual appliances L using both the power charged in the secondary battery 5 and the power generated by the solar cell 3 if possible during the time span in which the electricity rate of the commercial power source AC is high. DC appliances Ld on DC power supply lines Wd are operated with both the power charged in the secondary battery 5 and the generated power of the solar cell 3 via the power conditioner 4 and the converter 2a. Further, AC appliances La on AC power supply lines Wa are operated with both the charged power of the secondary battery 5 via the inverter 6 and the generated power of the solar cell 3 via the power conditioner 4. In this case, the secondary battery 5 and the solar cell 3 may be the main power sources, the amount of power supplied from the commercial power source AC becomes zero, and only surplus power that is not supplied to the appliances L, of the power generated by the solar cell 3, is used to charge the secondary battery 5.

However, when the residual capacity of the secondary battery 5 is reduced, when the power generated by the solar cell 3 is reduced, or when an appliance L having higher power consumption is used, it is difficult to drive the appliance L using only the residual capacity of the secondary battery 5 and the power generated by the solar cell 3. Accordingly, the power supplied from the commercial power source AC must be used, together with the secondary battery and the solar cell, even during the daytime in which the electricity rate is high, and thus this method is not economical.

Therefore, the control device 7 presents to the user a list of appliances L that can be operated with the current residual capacity of the secondary battery 5 and the power generated by the solar cell 3 (the available power of the DC power source).

First, when the user manipulates the manipulation unit 7e to make a list presentation request, the residual capacity detection unit 7a detects the residual capacity (Wh) of the secondary battery 5 and the amount of power (Wh) generated by the solar cell 3. Next, the appliance selection unit 7c compares the sum of the residual capacity of the secondary battery 5 and the power generated by the solar cell 3 with the power consumption of each appliance L in the appliance table TB, with reference to the appliance table TB of the power information storage unit 7b, and selects each appliance L of which the power consumption is equal to or less than the sum of the residual capacity of the secondary battery 5 and the power generated by the solar cell 3 from the appliance table TB as available appliances. In this processing of appliance selection, individual appliances L in the appliance table TB are classified as AC appliances La or DC appliances Ld. Accordingly, when the power consumption of each AC appliance La is compared with the sum of the residual capacity of the secondary battery 5 and the power generated by the solar cell 3, the conversion efficiency of each of the converter 2a, the power conditioner 4, and the inverter 6 can also be taken into consideration. Thus, the results of the selection of the appliances L are more accurate. The list creation unit 7d creates a available appliance list that presents appliances L selected by the appliance selection unit 7c and an unavailable appliance list that presents appliances L excluded from the selection by the appliance selection unit 7c. Furthermore, the list creation unit 7d outputs the available appliance list and the unavailable appliance list, together with information about the residual capacity of the secondary battery 5 and the amount of power generated by the solar cell 3, to the display device 8 that is provided near the control device 7 or integrated with the control device 7. The display device 8 displays of the information and the lists.

In this way, even in the present embodiment, the user sets the appliances L to be used by referring to the available appliance list, so that it is possible to effectively use the power charged in the secondary battery 5 and the power generated by the solar cell 3, without using the power supplied from the commercial power source AC if possible, during the daytime in which the electricity rate is high, thus efficiently and economically using the power charged in the secondary battery 5 and the power generated by the solar cell 3 when the appliances L are operated.

Further, the control device 7 controls power distribution so that power is supplied to individual appliances L using the power charged in the secondary battery 5 and the power generated by the solar cell 3 when the commercial power source AC experiences a power failure. The display device 8 displays information about the current residual capacity of the secondary battery 5 and the amount of power generated by the solar cell 3, the available appliance list, and the unavailable appliance list, similarly to the above case. Further, even in the case of a power failure, it is possible to effectively use the power charged in the secondary battery 5 and the power generated by the solar cell 3.

Further, the configuration of the present embodiment is applied even to embodiments 2 and 3, thus obtaining the same effects as those of the above embodiments.

Furthermore, although, in embodiments 1 to 4, the power distribution system equipped with both the AC power supply lines Wa for supplying power to AC appliances La driven by AC power and the DC power supply lines Wd for supplying power to DC appliances Ld driven by DC power has been exemplified, even a power distribution system equipped with either of the AC power supply lines Wa and the DC power supply lines Wd can control power distribution, similarly to the above power distribution system.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A power distribution system comprising:
   a direct current (DC) power source;
   a power supply unit for supplying power to a plurality of appliances using a power supplied from the DC power source or an AC power source;
   an appliance selection unit for selecting one or more appliances that can be operated with an available power of the DC power source;
   a display unit for displaying the selected one or more appliances to allow a user to choose, among the selected one or more appliances, at least one appliance to be actually used by the power supplied from the DC power source;
   an available power detection unit for detecting the available power, and
   a power information storage unit for storing information about a power consumption of each appliance,
   wherein the DC power source includes only a secondary battery,
   the available power is a residual capacity of the secondary battery, and
   the appliance selection unit selects the one or more appliances based on the residual capacity of the secondary battery and the information about the power consumption of each appliance.

2. The power distribution system of claim 1, wherein the appliance selection unit selects appliances, each of which can be operated with the available power of the DC power source.

3. The power distribution system of claim 2, wherein the display unit displays the one or more appliances in a descending order of power consumption.

4. The power distribution system of claim 1, further comprising a manipulation unit for allowing a user to designate appliances among the plurality of appliances,
   wherein the appliance selection unit selects, from the appliances designated by the manipulation unit, a combination of appliances that can be operated with the available power of the DC power source.

5. The power distribution system of claim 4, wherein the appliance selection unit selects all combinations of appliances, each of all the combinations being operable with the available power of the DC power source.

6. The power distribution system of claim 5, wherein the appliance selection unit selects, from the combinations of appliances, a combination of appliances a sum of power consumption of the combination being maximum among all the combinations.

7. The power distribution system of claim 1, wherein the information about the power consumption of each appliance, stored in the power information storage unit, is information generated based on a history of power consumed when each appliance is operated.

8. The power distribution system of claim 1, wherein the power distribution system is configured to supply the power supplied from the DC power source to the plurality of appliances prior to supplying the AC power to the plurality of appliances during a daytime.

9. A power distribution system comprising:
   a direct current (DC) power source;
   a power supply unit for supplying power to a plurality of appliances using a power supplied from the DC power source or an AC power source;
   an appliance selection unit for selecting one or more appliances that can be operated with an available power of the DC power source;
   a display unit for displaying the selected one or more appliances to allow a user to choose, among the selected one or more appliances, at least one appliance to be actually used by the power supplied from the DC power source;
   an available power detection unit for detecting the available power, and
   a power information storage unit for storing information about a power consumption of each appliance,
   wherein the DC power source includes a secondary battery and a solar cell,
   the available power is a sum of a residual capacity of the secondary battery and a power generated by the solar cell, and
   the appliance selection unit selects the one or more appliances based on the sum of the residual capacity of the secondary battery and the power generated by the solar cell and the information about the power consumption of each appliance.

10. The power distribution system of claim 9, wherein the appliance selection unit selects appliances, each of which can be operated with the available power of the DC power source.

11. The power distribution system of claim 10, wherein the display unit displays the one or more appliances in a descending order of power consumption.

12. The power distribution system of claim 9, further comprising a manipulation unit for allowing a user to designate appliances among the plurality of appliances,
    wherein the appliance selection unit selects, from the appliances designated by the manipulation unit, a combination of appliances that can be operated with the available power of the DC power source.

13. The power distribution system of claim 12, wherein the appliance selection unit selects all combinations of appliances, each of all the combinations being operable with the available power of the DC power source.

14. The power distribution system of claim 13, wherein the appliance selection unit selects, from the combinations of appliances, a combination of appliances a sum of power consumption of the combination being maximum among all the combinations.

15. The power distribution system of claim 9, wherein the information about the power consumption of each appliance, stored in the power information storage unit, is information generated based on a history of power consumed when each appliance is operated.

16. The power distribution system of claim 9, wherein the power distribution system is configured to supply the power supplied from the DC power source to the plurality of appliances prior to supplying the AC power to the plurality of appliances during a daytime.

17. A controller comprising:
    an appliance selection unit for selecting one or more appliances that can be operated with an available power of a DC power source,
    an outputting unit for displaying the selected one or more appliances to allow a user to choose, among the selected one or more appliances, at least one appliance to be actually used by the power supplied from the DC power source, and
    an available power acquisition unit for acquiring an amount of the available power,
    wherein the DC power source includes only a secondary battery,
    the available power is a residual capacity of the secondary battery, and the appliance selection unit selects the one or more appliances based on the residual capacity of the secondary battery and an information about a power consumption of each appliance.

18. A controller comprising:
an appliance selection unit for selecting one or more appliances that can be operated with an available power of a DC power source,
an outputting unit for displaying the selected one or more appliances to allow a user to choose, among the selected one or more appliances, at least one appliance to be actually used by the power supplied from the DC power source, and
an available power acquisition unit for acquiring an amount of the available power,
wherein the DC power source includes a secondary battery and a solar cell,
the available power is a sum of a residual capacity of the secondary battery and a power generated by the solar cell, and
the appliance selection unit selects the one or more appliances based on the sum of the residual capacity of the secondary battery and the power generated by the solar cell and an information about a power consumption of each appliance.

* * * * *